(12) United States Patent
Oyamada

(10) Patent No.: US 6,316,984 B1
(45) Date of Patent: Nov. 13, 2001

(54) INTERFACE CIRCUIT

(75) Inventor: Seisei Oyamada, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/512,129

(22) Filed: Feb. 24, 2000

(30) Foreign Application Priority Data

Feb. 26, 1999 (JP) ................................................ 11-049522

(51) Int. Cl.⁷ ...................................................... H03L 5/00
(52) U.S. Cl. ............................................................ 327/318
(58) Field of Search ............................... 326/30, 86, 90; 327/309, 310, 314, 318, 319, 320, 325, 326, 333, 493, 502, 504, 505, 583, 584; 323/17.2

(56) References Cited

U.S. PATENT DOCUMENTS

| | | | |
|---|---|---|---|
| 4,791,321 | * 12/1988 | Tanaka et al. | 307/451 |
| 5,341,114 | * 8/1994 | Calviello et al. | 333/17.2 |
| 5,528,167 | * 6/1996 | Samela et al. | 326/30 |
| 5,602,494 | * 2/1997 | Sundstrom | 326/39 |
| 5,731,711 | * 3/1998 | Gabara | 326/30 |
| 5,767,695 | * 6/1998 | Takakuma et al. | 326/30 |
| 5,789,994 | * 8/1998 | Case et al. | 333/20 |
| 5,821,804 | * 10/1998 | Nikutta et al. | 327/382 |
| 5,955,889 | * 9/1999 | Taguchi et al. | 326/30 |

\* cited by examiner

*Primary Examiner*—Jeffrey Zweizig
(74) *Attorney, Agent, or Firm*—Bret J. Petersen; Frederick J. Telecky, Jr.

(57) ABSTRACT

An interface circuit which can transmit signals at high speed in a back plane application, which, in turn, can transmit signals among multiple circuit substrates via the transmission lines on a back board. Card $5_2$ of the present invention has input circuit $9_2$, wiring $21_2$, and clamping circuit $40_2$. Wiring $21_2$ is connected to the input of input circuit $9_2$, and clamping circuit $40_2$ is connected to wiring $21_2$. A signal is transmitted from transmission line 3 on back board 2 to wiring $21_2$ via socket $4_2$. However, when the transmitted signal rises or drops significantly, the signal is clamped by clamping circuit $40_2$ so that it will not go outside a certain voltage range. The vibration amplitude of the signal becomes small. Consequently, the time needed for the input potential of input circuit $9_2$ to be stabilized can be reduced and signals can be transmitted at high speed.

7 Claims, 5 Drawing Sheets

INTERFACE CIRCUIT

FIELD OF THE INVENTION

The present invention pertains to an interface circuit. More specifically, the present invention pertains to an interface circuit which is used for a switchboard, etc. to transmit signals at high speed.

BACKGROUND OF THE INVENTION

A backplane application is a system which can transmit a large volume of data in parallel. It is used in many types of industrial equipment (large-scale hard disk, switchboard, transmission device, measurement equipment, etc.).

Reference number 101 in FIG. 6 represents a conventional backplane application. Said backplane application 101 comprises back board 102 and multiple cards 105.

Back board 102 is made of a thin rectangular substrate. Multiple transmission lines 103 are formed on the back board. Said multiple transmission lines 103 are arranged in the longitudinal direction of back board 102. The transmission lines are arranged in parallel to each other at prescribed intervals. Socket 104 is arranged on back board 102 in such a way that it crosses each transmission line 103. There are multiple sockets 104 which are arranged at prescribed intervals.

Each card 105 has an internal circuit 106, an input/output circuit 110, wiring 121, and a connection part (not shown in the figure). Internal circuit 106 is electrically connected to the connection part via input/output circuit 110 and wiring 121.

Input/output circuit 110 has output circuit 108 and input circuit 109 which are connected back to back. Either output circuit 108 or input circuit 109 is operated under the control of internal circuit 106.

Each card 105 has a signal line group 107 and a connector 118. Internal circuit 106 is connected to an external device (not shown in the figure) via signal line group 107 and connector 118.

In said backplane application 101, one card 105 is inserted into one socket 104. As shown in FIG. 6, each of three cards $105_1$–$105_3$ are inserted into each of three sockets $104_1$–$104_3$, respectively.

In this case, the internal circuits $106_1$–$106_3$ of cards $105_1$–$105_3$ are electrically connected to each other via the connection parts of cards $105_1$–$105_3$ and the transmission lines 103 on back board 102.

In said plane application 101, to transfer a signal from internal circuit 106$_1$ of card 105$_1$ on the output side to internal circuit 106$_2$ of card 105$_2$ on the input side, only output circuit 108$_1$ is switched into the active state in the input/output circuit 110$_1$ on the output side, and only input circuit 109$_2$ is switched into the active state in the input/output circuit 110$_2$ on the input side. When a high-voltage (high-level) signal or low-voltage (low-level) signal is output from output circuit 108$_1$ on the output side corresponding to the output signal of internal circuit 106$_1$ on the output side, the signal is output to transmission line 103 via wiring 121$_1$ on the output side and socket 104$_1$. The signal is then input from transmission line 103 to internal circuit 106$_2$ on the input side via socket 104$_2$ of card 105$_2$ on the input side, wiring 121$_2$, and input circuit 109$_2$.

As described above, the signal is transferred from internal circuit 106$_1$ on the output side to internal circuit 106$_2$ on the input side.

In said backplane application 101, one input/output circuit 110 on one card is connected to one transmission line 103. Since multiple input/output circuits 110 are arranged on each card 105, data with the same number of bits as the number of the input/output circuits 110 on a card can be transmitted in parallel among multiple internal circuits 106 in said backplane application 101.

In said backplane application 101, it is required that signals be transmitted as fast as possible between cards 105. As shown in the equivalent circuit diagram illustrated in FIG. 7, terminal resistors $115_1$, $115_2$, $116_1$, and $116_2$ are connected in series and arranged at the two ends of transmission line 103.

However, parasitic capacitance is present in said back board 102 and in the wiring of each card 105. Specifically, there is a large parasitic capacitance between input/output circuit 110 of each card 105 and wiring 121 of the socket. Since many cards 105 are installed on back board 102, the total parasitic capacitance of backplane application 101 is very large.

Due to the aforementioned large parasitic capacitance, signals will vary significantly while being transmitted, and the potential of each wiring 121 also varies significantly. Since the potential of each wiring 121 is not stable over a long period of time, it will take a long time for the output of input circuit 109 to settle to either a high level or a low level. As a result, signals cannot be transmitted between output circuit 108 and input circuit 109 at high speed.

To suppress changes in the signal, the resistance values of terminal resistors $115_1$, $115_2$, $116_1$, and $116_2$ are reduced. In this case, however, power consumption becomes very high. This is a problem.

The purpose of this invention is to solve the aforementioned problems of the conventional technology by providing a technology which can transmit signals at high speed.

SUMMARY OF THE INVENTION

In order to realize the aforementioned purpose, Claim 1 of the present invention provides an interface circuit having an input circuit whose input terminal is electrically connected to a signal line, and a clamping circuit, which is electrically connected between the aforementioned signal line and a reference voltage supply terminal and has such a configuration that it is able to maintain the voltage of the aforementioned signal line at a first clamping voltage, which is higher than the aforementioned reference voltage by a prescribed amount, or at a second clamping voltage which is lower than the aforementioned reference voltage by a prescribed amount.

According to Claim 2 of the present invention, in the interface circuit described in Claim 1, the aforementioned clamping circuit has first and second diode circuits which are electrically connected in parallel with each other between the aforementioned signal line and reference voltage supply terminal, and the aforementioned first and second diode circuits are connected in opposite directions.

According to Claim 3 of the present invention, in the interface circuit described in Claim 2, the aforementioned first or second diode circuit comprises two diodes which are connected in series.

According to Claim 4 of the present invention, in the interface circuit described in Claim 1, 2, or 3, there is a switch circuit which is electrically connected between the aforementioned clamping circuit and reference voltage supply terminal.

As described above, in the present invention, the clamping circuit is connected to the signal line (wiring) connected to the input terminal (input side) of the input circuit.

Consequently, even when the input voltage of the input circuit varies significantly, since it is clamped to the first or second clamping voltage, the change in the input voltage will not exceed the voltage range between the first and second clamping voltages.

Therefore, compared with the conventional circuit in which the variation in the input voltage is not limited, the time that it takes for the input voltage of the input circuit to settle down and converge to a certain level can be shortened significantly. As a result, it becomes possible to transmit signals between the transmission lines and the circuit substrate at high speed.

The clamping circuit is connected to wiring. However, if the clamping circuit is connected to wiring far away from the input circuit, even if the input voltage is clamped to the first or second clamping voltage using the clamping circuit, it is still unable to stabilize the input voltage of the input circuit under the influence of the parasitic capacitance that exists between the input of the input circuit and the place where the clamping circuit is connected.

On the other hand, if the clamping circuit is connected to wiring that is close to the input circuit, the influence of the parasitic capacitance of the wiring between the input of the input circuit and the place where the clamping circuit is connected can be eliminated. Consequently, the input voltage of the input circuit can be reliably stabilized when clamped to the first or second clamping voltage.

In the present invention, the clamping circuit has first and second diode circuits. The anode of the first diode circuit is connected to the wiring side, while the cathode is connected to the part (supply terminal) where the reference voltage (threshold voltage) is input. The connection of the second diode circuit is opposite to that of the first diode circuit. That is, the cathode is connected to the wiring side, while the anode is connected to the part where the threshold voltage is input.

When a signal transmitted in a wiring rises or falls significantly, either the first or the second diode circuit is turned on. As a result, the potential of the wiring is clamped at a level which is either higher or lower than the threshold voltage by the forward voltage drop of the diode circuit, and the potential of the wiring will not continue to rise or fall. Consequently, compared with the conventional circuit in which the variation in the input voltage is not limited, the time that it takes for the input voltage of the input circuit to settle down and converge to a certain level can be reduced.

Also, when the first and second diode circuits comprise multiple diodes that are connected in series, by appropriately setting the number of the diodes in advance, the first and second clamping voltages can be set to levels between the upper and lower limits of the signal transmitted in the wiring and are able to stabilize the output of the input circuit at either the high level or low level in a reliable manner.

In the interface circuit of the present invention, a switch circuit is connected to the diode circuits. When the switch circuit is on, the threshold voltage can be applied to the aforementioned wiring via the switch and the diode circuits.

BRIEF DESCRIPTION OF THE DRAWINGS

FIG. 3($b$) is a diagram explaining the operating characteristic of the ULTTL driver used in the embodiment of the present invention.

FIG. 4($b$) is a diagram explaining another embodiment of the clamping circuit used in the present invention.

REFERENCE NUMERALS AS SHOWN IN THE DRAWINGS

1 Back-plane application
2 Back board
3 Transmission line
$4_1$–$4_3$ Sockets
$5_1$–$5_3$ Cards (circuit substrates)
$6_1$–$6_3$ Internal circuits
$7_1$–$7_3$ Signal line groups
$8_1$–$8_3$ Output circuits
$9_1$–$9_3$ Input circuits
$21_1$–$21_3$ Wirings
$40_1$–$40_3$ Clamping circuits

DESCRIPTION OF EMBODIMENTS

In the following, the embodiment of the present invention will be explained with reference to figures.

Figure 1:
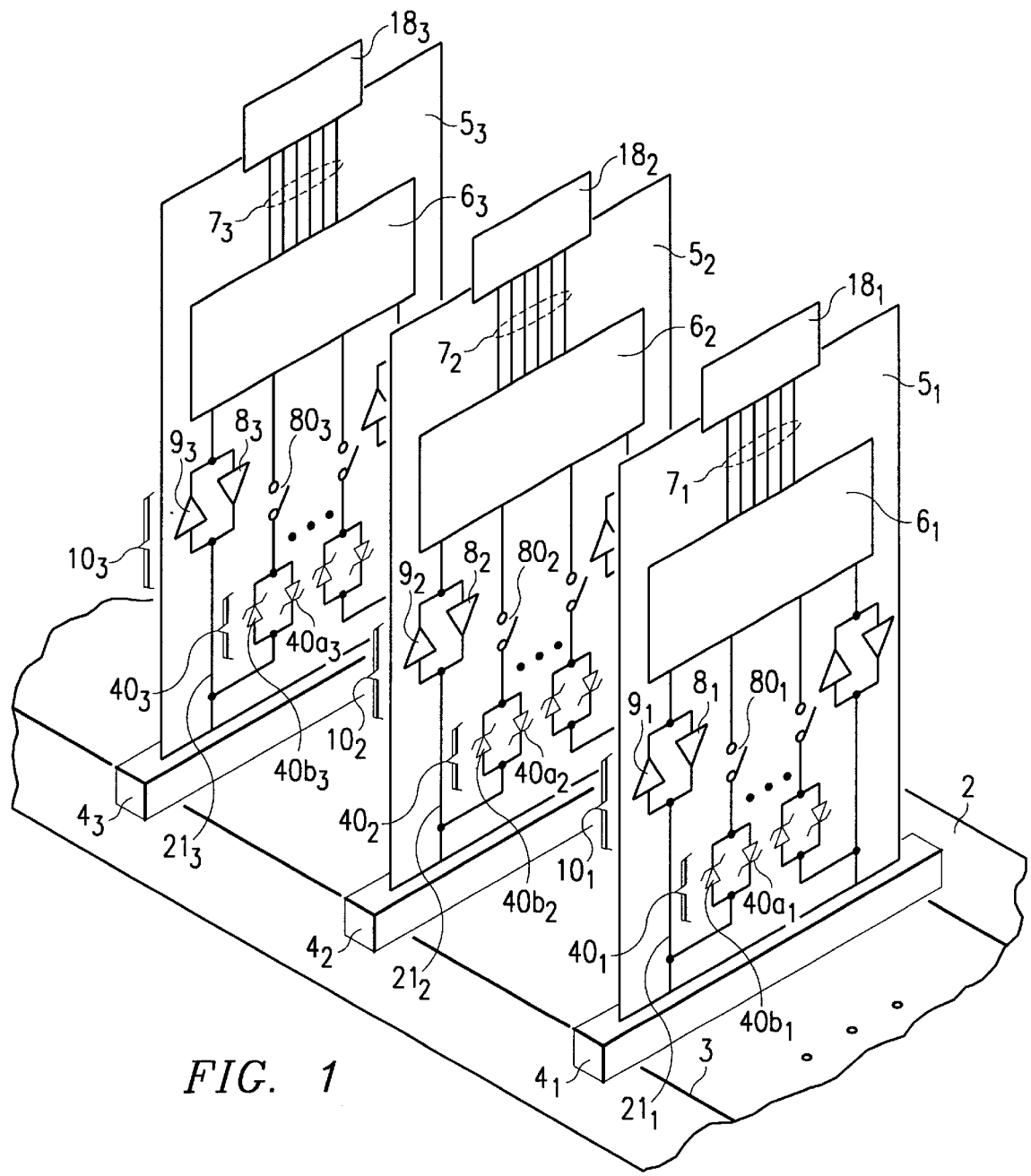
FIG. 1 is an oblique view illustrating the backplane application of the present invention.

Reference number 1 in FIG. 1 represents a backplane application disclosed in the present invention. Said backplane application 1 has a back board 2. As shown in FIG. 1, three sockets $4_{1-43}$ are arranged on back board 2, and cards $5_1$–$5_3$ are inserted into these sockets, respectively.

Back board 2 has multiple transmission lines 3 and sockets $4_1$–$4_3$. However, since back board 2, transmission lines 3, and sockets $4_1$–$4_3$ are respectively identical to back board 102, transmission lines 103, and sockets $104_1$–$104_3$ explained above, the detailed explanation for these parts is omitted.

Said cards $5_1$–$5_3$ have input/output circuits $10_{1-103}$, wirings $21_1$–$21_3$, and connection parts (not shown in the figure), respectively. Since internal circuits $6_1$–$6_3$ are electrically connected to the connection parts via wirings $21_1$–$21_3$ and input/output circuits $10_1$–$10_3$, respectively, the internal circuits $6_1$–$6_3$ of said cards $5_1$–$5_3$ are electrically connected to each other via the connection parts of cards $5_1$–$5_3$ and transmission lines 3 on back board 2.

Said input/output circuits $10_1$–$10_3$ have output circuits $8_1$–$8_3$ and input circuits $9_1$–$9_3$, respectively. Said output circuits $8_1$–$8_3$ and input circuits $9_1$–$9_3$ are connected in parallel with each other but in opposite directions. Either output circuits $8_1$–$8_3$ or input circuits $9_1$–$9_3$ are operated under the control of internal circuits $6_1$–$6_3$.

Figure 2:
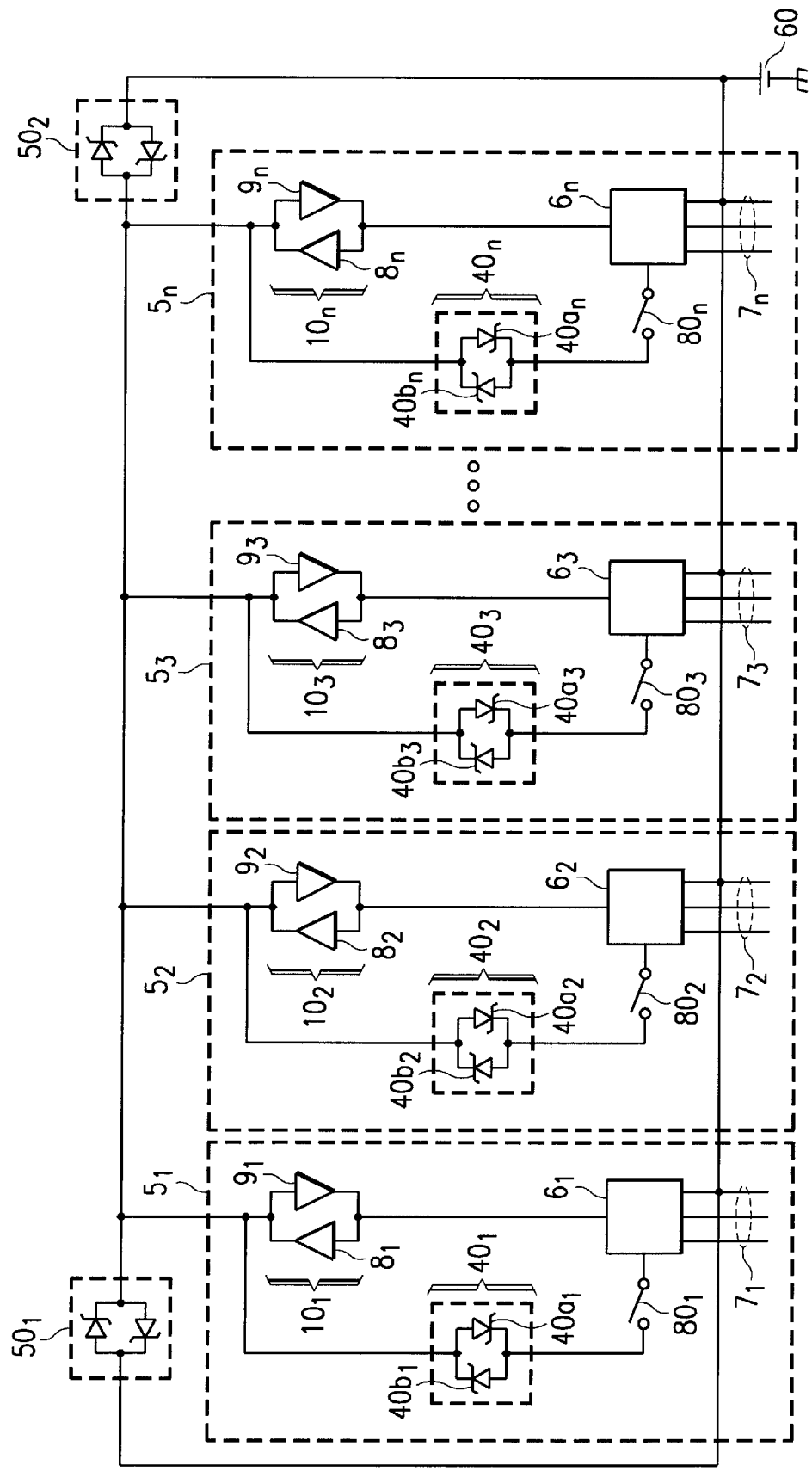
FIG. 2 is an equivalent circuit diagram explaining the backplane application of the present invention.

Said cards $5_1$–$5_3$ also have signal line groups $7_1$–$7_3$ and connectors $18_1$–$18_3$, respectively. Internal circuits $6_1$–$6_3$ are electrically connected to an external device (not shown in the figure) via signal line groups $7_1$–$7_3$ and connectors $18_1$–$18_3$, respectively. An auxiliary power supply 60 (see FIG. 2 is arranged in the external device. Said auxiliary power supply 60 can generate threshold voltage $V_t$ used for discriminating the high level and low level of the outputs of input circuits $9_1$–$9_3$.

In addition, said cards $5_1$–$5_3$ have clamping circuits $40_1$–$40_3$, respectively. The aforementioned threshold voltage $V_t$ is input to clamping circuits $40_1$–$40_3$ via signal line groups $7_1$–$7_3$, internal circuits $6_1$–$6_3$, and switches $80_1$–$80_3$, respectively.

Figure 4A:
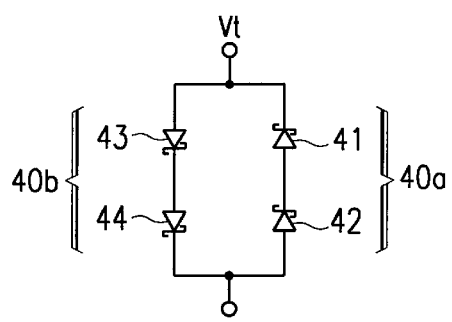
FIG. 4($a$) is a diagram explaining an embodiment of the clamping circuit used in the present invention.

Each of said clamping circuits $40_1$–$40_3$ has a pair of diode circuits 40a and 40b. As shown in FIG. 4(a), diode circuit 40a comprises two Schottky diodes 41 and 42 connected in series, and diode circuit 40b comprises two Schottky diodes 43 and 43 connected in series.

The anodes of diode circuits $40a_1$–$40a_3$ are connected to auxiliary power supply 60 via switches $80_1$–$80_3$, internal circuits $6_1$–$6_3$, signal line groups $7_1$–$7_3$, and connectors $18_1$–$18_3$. The cathodes are connected to wirings $21_1$–$21_3$.

The connection of diode circuits 40b is opposite to that of diode circuits $40a_1$–$40a_3$. That is, the cathodes are connected to auxiliary power supply 60 via switches $80_1$–$80_3$, internal circuits $6_1$–$6_3$, signal line groups $7_1$–$7_3$, and connectors $18_1$–$18_3$, while the anodes are connected to wirings $21_1$–$21_3$.

In each clamping circuit 40, diode circuit 40a will be turned on when the potential of wiring 21 rises, and diode circuit 40b will be turned on when the potential of wiring 21 falls.

When diode circuit 40a is turned on, the potential of wiring 21 is clamped to a high clamping voltage (referred to as the clamping voltage on the high-voltage side hereinafter), $V_t+2V_f$, which is higher than threshold voltage $V_t$ by the forward voltage drop $V_f$ of two Schottky diodes 41 and 42.

On the other hand, when another diode circuit 40b is turned on, the potential of wiring 21 is clamped to a low clamping voltage (referred to as the clamping voltage on the low voltage side hereinafter), $V_k-2V_f$, which is lower than threshold voltage $V_t$ by the forward voltage drops $V_f$ of two Schottky diodes 43 and 44.

In this case, the power supply voltage Vcc is set at 3.3 V, and the threshold voltage $V_t$ is set at 1.5 V. Since the forward voltage drop $V_f$ of Schottky diodes $4_1$–$4_4$ is 0.5 V, the clamping voltages on the high-voltage side and on the low-voltage-side are 2.5 V and 0.5 V, respectively.

FIG. 2 is an equivalent circuit diagram illustrating the state of connecting input/output circuits $10_1$–$10_3$ of cards $5_1$–$5_3$ to transmission line 3. Clamping circuits $50_1$ and $50_2$ with the same configuration as clamping circuit 40 are arranged at the two ends of transmission line 3. The potential at the two ends of transmission line 3 is clamped at either the clamping voltage $V_t+2V_f$ on the high-voltage side or the clamping voltage $V_t-2V_f$ on the low-voltage-side.

In backplane application 1 with the aforementioned configuration, to transfer a signal from internal circuit $6_1$ of card $5_1$ on the output side to internal circuit $6_2$ of card $5_2$ on the input side, only output circuit $8_1$ is turned on in input/output circuit $10_1$ on the output side, and only input circuit $9_2$ is turned on in input/output circuit $10_2$ on the input side. Also, switch $80_1$ of card $5_1$ on the output side is turned off so that clamping circuit $40_1$ on the output side will not be operated, and switch $80_2$ of card $5_2$ on the input side is turned on so that clamping circuit $40_2$ on the input side is switched to the operating state.

At this time, internal circuit $6_1$ on the output side drives output circuit $8_1$ on the output side to output a high-level or low-level signal to transmission line 3 via wiring $21_1$ on the output side and socket $4_1$.

The signal output to transmission line 3 is input to input circuit $9_2$ on the input side via socket $4_2$, which is connected to card $5_2$ on the input side and wiring $21_2$ of card $5_2$ on the input side. Since clamping circuit $40_2$ is connected to wiring $21_2$ which, in turn, is connected to the input of input circuit $9_2$, when the input potential of input circuit $9_2$ rises and Schottky diodes $4_1$ and $4_2$ are turned on, the input potential of input circuit $9_2$ is at the clamping voltage $V_t+2V_f$ on the high-voltage side and will not rise further.

On the other hand, when the input potential of input circuit $9_2$ falls and Schottky diodes 43 and 44 are turned on, the input potential of input circuit $9_2$ becomes the clamping voltage $V_t-2V_f$ on the low-voltage-side and will not drop further.

Consequently, even if the input potential varies, the variation will not exceed the voltage range between the clamping voltage $V_t+2V_f$ on the high-voltage side and the clamping voltage $V_t-2V_f$ on the low-voltage-side. In this way, compared with the conventional circuit in which the variation in the input voltage is not limited, the time that it takes for the input voltage of the input circuit to settle down and converge to a certain level can be reduced. Therefore, it becomes possible to transmit signals at high speed between the transmission line and the circuit substrate.

The present inventors output the same high-level signals to transmission line 3 of backplane application disclosed in the aforementioned embodiment and to transmission line 103 of the conventional backplane application 101 and measured the input potentials of input circuits $9_2$, $109_2$ connected to transmission lines 3 and 103, respectively. In this case, the highlevel signals were output to transmission lines 3 and 103 at time $t_0$, and the voltages of transmission lines 3 and 103 were 0 V before time $t_o$.

Figure 5:
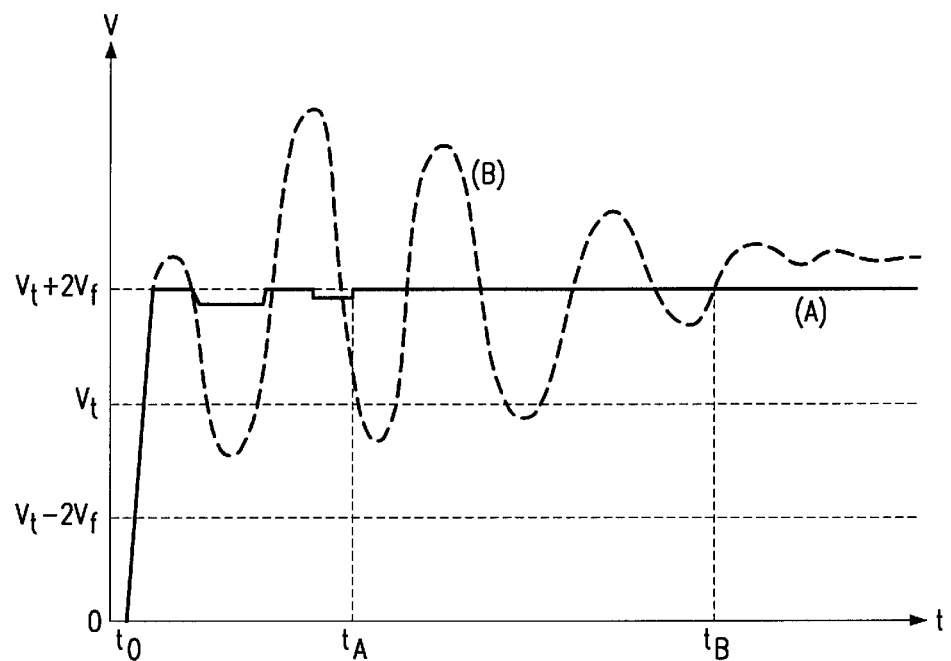
FIG. 5 is a voltage waveform diagram illustrating the results of measuring the input potential of the input circuit for both the backplane application of the present invention and the conventional back-plane application.
Figure 7:
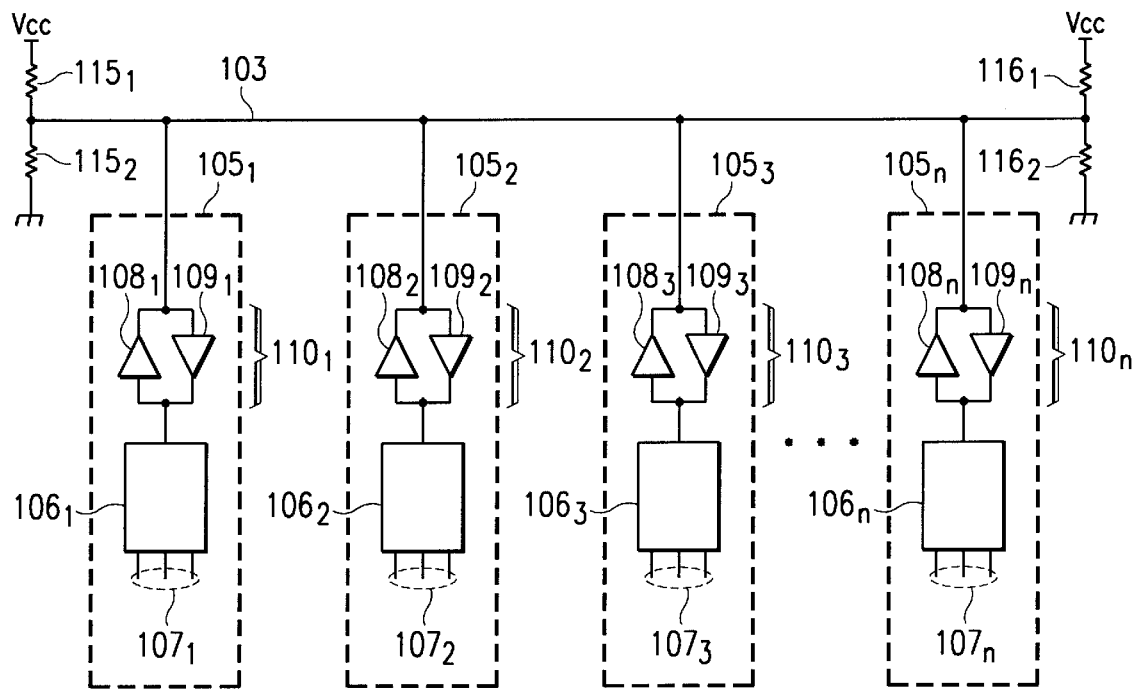
FIG. 7 is an equivalent circuit diagram explaining the conventional backplane application
Figure 6:
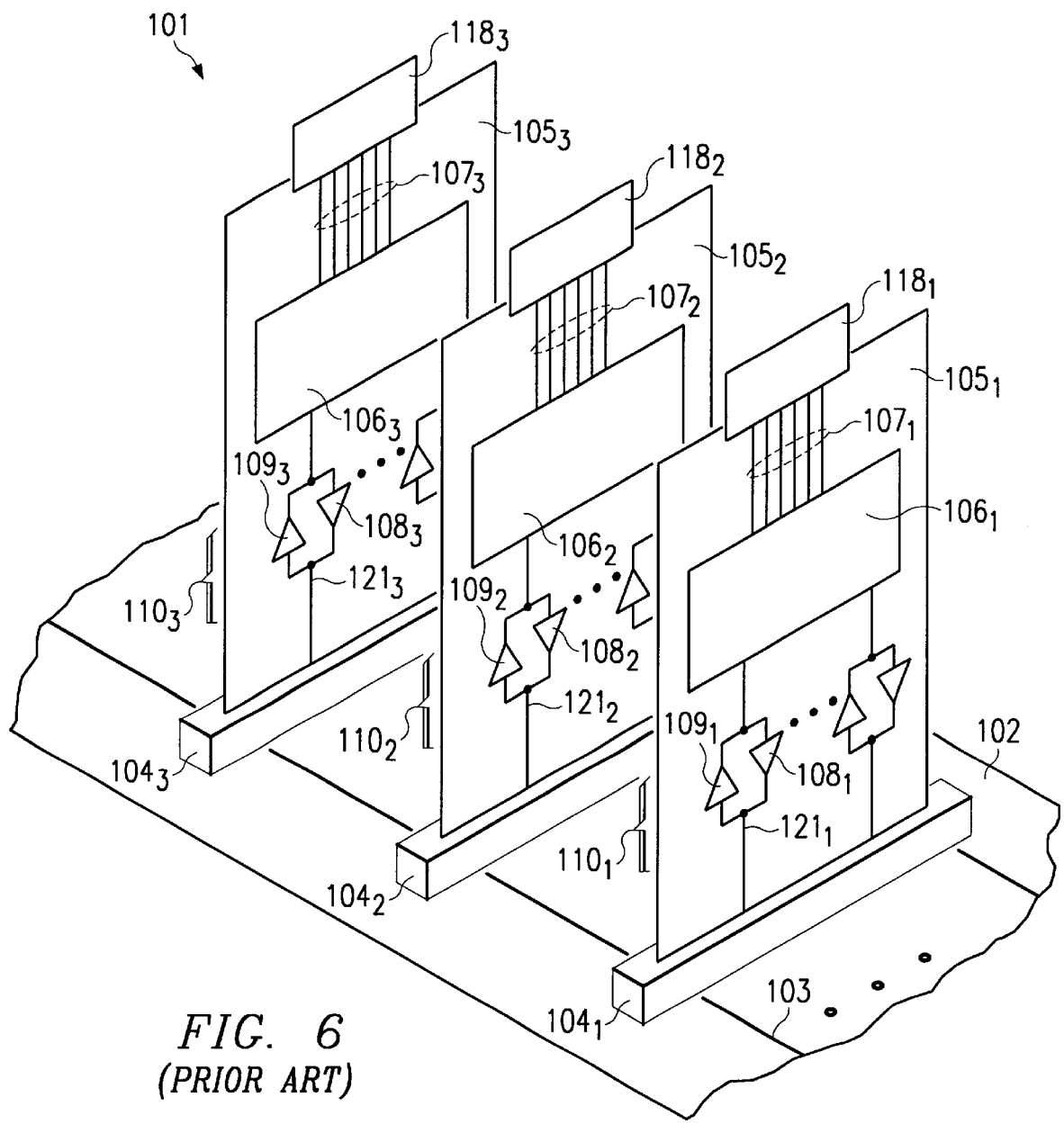
FIG. 6 is an oblique view illustrating a conventional back-plane application.

Curve B in FIG. 5 shows the results of measuring the input potential of the conventional input circuit $109_2$. In this case, the input potential rises to a level much higher than the clamping voltage $V_t+2V_f$ on the high-voltage side after it starts to rise at time $t_0$. Then, the input potential varies significantly and settles to an almost constant level at time $t_B$ after a long period of time.

On the other hand, curve A in FIG. 5 shows the results of measuring the input potential of input circuit 92 disclosed in the present invention. In this case, the input potential starts to rise from time to. However, the input potential is restrained by clamping circuit $40_2$ even if it tends to exceed the clamping voltage $V_t+2V_f$ on the high-voltage side. Therefore, the input potential will not rise above the clamping voltage $V_t+2V_f$ on the high-voltage side. Then, the input potential oscillates about the clamping voltage $V_t+2V_f$ on the high-voltage side. However, since the amplitude is very small, the input potential settles down to an almost constant level at time $t_A$, which is much shorter than time $t_B$.

By comparing curves A and B, it is found that the input potential of input circuit $9_2$ disclosed in the present invention can be stabilized in a shorter period of time compared to the conventional circuit.

In said backplane application 1, one input/output circuit 10 arranged on one card can be connected to one transmission line 3, and multiple input/output circuits 10 are arranged on each card 5. Consequently, data with the same number of bits as the number of the input/output circuits 10 can be transmitted in parallel among internal circuits 6 of the various cards.

Figure 3A:
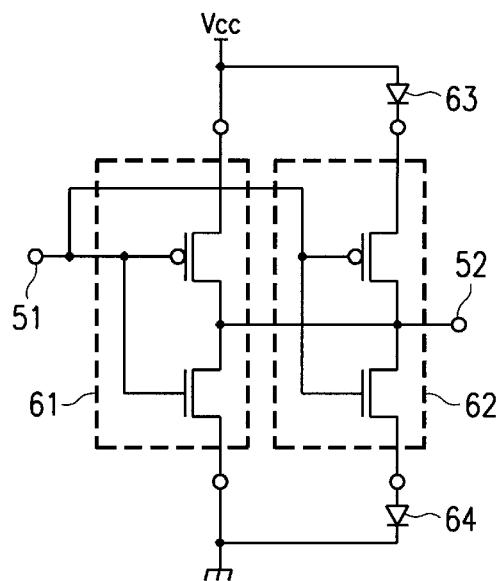
FIG. 3($a$) is a circuit diagram illustrating the ULTTL driver used in the embodiment of the present invention.

In the aforementioned embodiment, the ULTTL driver shown in FIG. 3(a) is used as output circuit 8. The ULTTL driver has two CMOS inverters 61 and 62 as well as diodes 63 and 64.

The power supply terminal and ground terminal of one CMOS inverter 61 are directly connected to power supply voltage Vcc and the ground potential, respectively. The power supply terminal and ground terminal of another CMOS inverter 62 are connected to power supply voltage Vcc and the ground potential via diodes 63 and 64, respectively.

The inputs of said two CMOS inverters 61 and 62 are shorted together and connected to input terminal 51. The outputs of said two CMOS inverters 61 and 62 are also shorted together and connected to output terminal 52. When a signal is input from input terminal 51, the input signal is inverted, and a high-level or low-level signal is output from output terminal 52. CMOS inverter 62 which has diodes 63 and 64 connected has a lower impedance than CMOS inverter 61.

For example, when the potential of output terminal 52 goes from the low level to the high level, the diode 63 on the side of the power supply voltage can be turned on, and the CMOS inverter 62 with the lower impedance can be turned on during the initial stage when the potential of output terminal 52 is still near the low level. Consequently, a large current can be supplied from said CMOS inverter 62 to wiring 21 via output terminal 52.

When the potential of output terminal 52 rises and reaches a level close to power supply voltage Vcc, the diode 63 on the side of the power supply voltage is turned off, and the CMOS inverter 62 connected to said diode 63 is cut off from power supply voltage Vcc. The current is supplied only from the other CMOS inverter 61. Said CMOS inverter 61 has a smaller output current because it has a higher impedance than CMOS inverter 62, which is connected to diode 63. Consequently, when the potential of output terminal 52 is close to the high level, the power consumption of the entire ULTTL becomes low.

On the other hand, when the potential of output terminal 52 goes from the high level to the low level, the diode 64 on the side of ground potential can be turned on, and the CMOS inverter 62 with the lower impedance can be turned on during the initial stage when the potential of output terminal 52 is still close to the high level. Consequently, a large current can be supplied from CMOS inverter 62 to wiring 21 via output terminal 52.

When the potential of output terminal 52 drops and reaches a level close to the ground potential, the diode 64 on the side of the ground potential is turned off, and the CMOS inverter 62 with the lower impedance is cut off from ground potential. As a result, only a small current is supplied from another CMOS inverter 61. Consequently, when output potential 52 is close to the low level, the power consumption of the entire ULTTL becomes low.

Figure 3B:
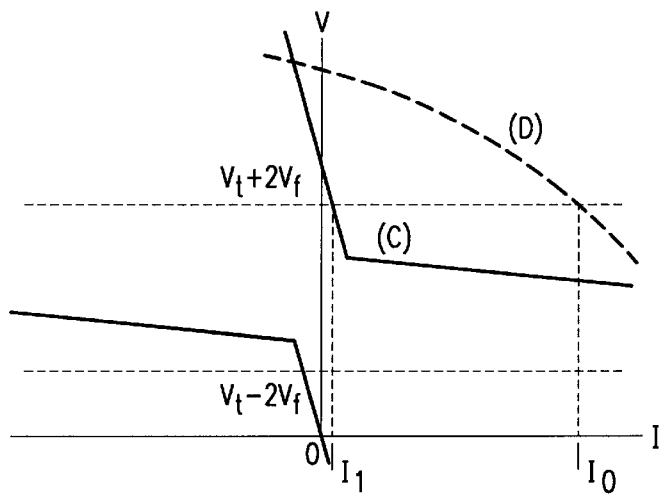

As described above, the ULTTL driver has the current-voltage characteristic illustrated by curve C shown in FIG. 3(*b*). For the ULTTL driver, current $I_1$ at the clamping voltage $V_t+2V_f$ on the high-voltage side is very small.

In FIG. 3(*b*), curve D shows the current-voltage characteristic of a normal high output driver. As can be seen from curve D, current $I_0$, which flows when the input potential of the high output driver is clamped to the clamping voltage $V_t+2V_f$ on the high-voltage side, varies significantly as reflected by curve D. Therefore, the high output driver cannot be used in practical applications. On the other hand, the power consumption of the aforementioned ULTTL driver is low during clamping. Consequently, the ULTTL driver can be used as output circuit 8.

In the aforementioned embodiment, each input/output circuit 10 has an output circuit 8 and an input circuit 9 and is able to transmit signals bidirectionally. The present invention, however, is not limited to this configuration. It is also possible to transmit signals unidirectionally. For example, the configuration can be designed in such a way that one card has an output circuit, while the other cards have only input circuits. The signal output from the card with the output circuit is input to all of the other cards.

In the aforementioned embodiment, all of the cards have clamping circuit 40. The present invention, however, is not limited to this configuration. Since the clamping circuit should be installed at least in input circuit 9, when cards equipped with output circuits only are used, it is possible to omit the clamping circuits from the cards which have only output circuits.

In the aforementioned embodiment, the clamping voltage on the high-voltage side and the clamping voltage on the low-voltage-side are set at 2.5 V and 0.5 V, respectively. However, the clamping voltages of the present invention are not limited to these values. The clamping voltage can be set to any level as long as it is between the power supply voltage and threshold voltage $V_t$ and is able to bring the output of input circuit 9 to either the high level or the low level. For example, the clamping voltage on the high-voltage side and the clamping voltage on the low-voltage-side can be set to 3 V and 1 V, respectively.

Figure 4B:
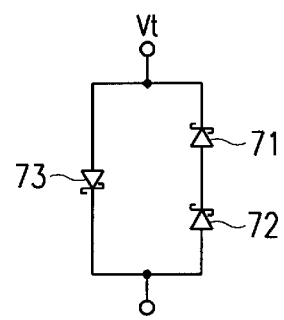

As shown in FIG. 4(*a*), a circuit formed by connecting two pairs of serially-connected Schottky diodes in back to back is used as the clamping circuit. However, the clamping circuit of the present invention is not limited to this configuration. Any type of clamping circuit can be used as long as it is able to clamp to a voltage which is between the power supply voltage and threshold voltage $V_t$ and can bring the output of input circuit 9 to either the high level or low level. For example, as shown in FIG. 4(*b*), it is also possible to connect two serially-connected Schottky diodes 71 and 72 back to back with one Schottky diode 73. In the clamping circuit shown in FIG. 4(*b*), when the potential of the wiring rises, the potential of wiring 21 will be clamped to the clamping voltage $V_t+2V_f$, which is higher than threshold voltage $V_t$ by the forward voltage drop $V_f$ of two Schottky diodes 71 and 72. When the potential of wiring 21 drops, it will be clamped to a clamping voltage $V_t-V_f$, which is lower than threshold voltage $V_t$ by the forward voltage drop $V_f$ of one Schottky diode 73.

Also, the ULTTL driver shown in the figure is used as the input circuit or output circuit. However, the input circuit or output circuit is not limited thereto. Any type of input circuit or output circuit can be used as long as it can be driven with a low power consumption when clamped by the clamping circuit.

Even if the input voltage of the input circuit oscillates significantly, since it is clamped to the first or second clamping voltage, the input voltage will not oscillate outside the voltage range between the first and second clamping voltages.

Consequently, compared to the conventional circuit in which the variation in the input voltage is not limited, the time that it takes for the input voltage of the input circuit to settle down and converge to a certain level can be reduced. As a result, it becomes possible to transmit signals at a high speed between the transmission lines and the circuit substrate.

What is claimed is:

1. An interface circuit having an input circuit, whose input terminal is electrically connected to a signal line, and a clamping circuit, which is electrically connected between the aforementioned signal line and a reference voltage supply terminal and has such a configuration that it is able to maintain the voltage of the aforementioned signal line at a first clamping voltage which is higher than the aforementioned reference voltage by a prescribed amount, or at a second clamping voltage which is lower than the aforementioned reference voltage by a prescribed amount and wherein the clamping circuit has first and second diode circuits which are electrically connected in parallel to each other between the aforementioned signal line and reference voltage supply terminal, and the aforementioned first and second diode circuits are connected in opposite directions.

2. The interface circuit of claim 1, wherein the first or second diode circuit comprises two diodes which are connected in series.

3. The interface circuit of claim 1, further comprising a switch circuit which is electrically connected between the aforementioned clamping circuit and reference voltage supply terminal.

4. The interface circuit of claim 1, further comprising a switch circuit which is electrically connected between the aforementioned clamping circuit and reference voltage supply terminal.

5. The interface circuit of claim 2, further comprising a switch circuit which is electrically connected between the aforementioned clamping circuit and reference voltage supply terminal.

6. The interface circuit of claim 1, wherein the first or second diode circuit comprises two zener diodes which are connected in series.

7. The interface circuit of claim 6, further comprising a switch circuit which is electrically connected between the aforementioned clamping circuit and reference voltage supply terminal.

* * * * *